Jan. 31, 1967    T. E. BAN    3,301,662
BASIC OXYGEN STEEL MAKING PROCESS
Filed Dec. 10, 1962    3 Sheets-Sheet 2

INVENTOR.
THOMAS E. BAN
BY Justin C. Macklin
ATTORNEY.

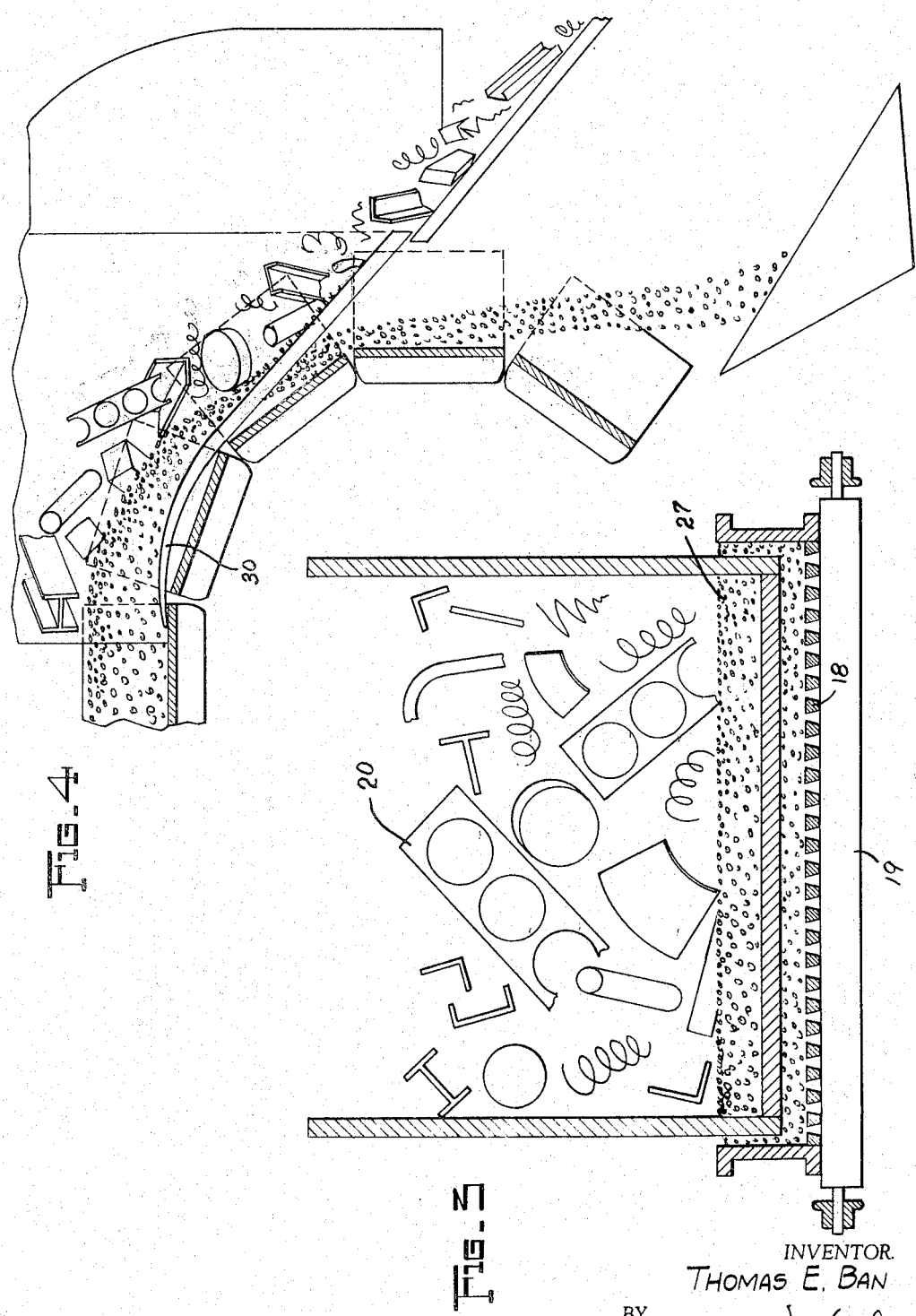

United States Patent Office 3,301,662
Patented Jan. 31, 1967

3,301,662
BASIC OXYGEN STEEL MAKING PROCESS
Thomas E. Ban, Cleveland Heights, Ohio, assignor, by mesne assignments, to McDowell-Wellman Engineering Company
Filed Dec. 10, 1962, Ser. No. 243,321
3 Claims. (Cl. 75—52)

This invention relates, as indicated, to an improved process for making steel utilizing a basic oxygen or oxygen lance process, and more particularly to an improved basic oxygen steel making process which tolerates much greater proportions of scrap metal than heretofore possible.

A most satisfactory and more efficient system for steel making by the basic oxygen process is provided when scrap metal coolant is preheated to a temperature substantially above its normal temperature, i.e. above about 500° F., and preferably between about 1000° F. and 2200° F. by heat contained in the basic oxygen process exhaust gases, and such preheated scrap is immediately charged into a predetermined weight of molten pig iron in a basic oxygen furnace.

The basic oxygen process, in general, provides a means for purifying pig iron, such as may be received from a blast furnace, which utilizes a jet of pure oxygen gas impinged against the surface of a molten charge of slag and pig iron for the purpose of burning impurities out of the molten metal. The principal impurity is carbon, along with other impurities such as silicon, and phosphorus. This oxidation reaction in this process is extremely violent and exothermic. Pig iron may contain as much as 3%–4.5% carbon. While air has been blown through a molten metal charge such as in the Bessemer converter, or exposed to the molten metal in an open hearth furnace, both of these processes have demonstrated limitations in terms of production, and are steadily being replaced by the basic oxygen process.

The impurities in pig iron, or "fuel" components thereof, readily and violently combine with pure oxygen with the result that the temperature of the molten change is greatly elevated. In order to offset the temperature rise due to the exothermic nature of the oxidation reaction which occurs, it has become the practice to "quench" the charge by adding a predetermined portion of scrap iron at room temperature. The introduction of up to 20%–30% by weight of the metallic charge of such scrap iron served as a coolant to the charge without introducing impurities to an intolerable extent. Economically, scrap iron at present prices ranges between about $25 and $30 per ton; and in the molten condition in the basic oxygen furnace is worth about ⅔ again as much. Therefore, it is highly desirable from an economic point of view to increase the proportion of scrap metal which can be tolerated by a furnace charge. As indicated above, and taking into consideration the chemical reactions which must occur and the thermal balance of the system, no more than about 30% by weight of scrap can be successfully added to a basic oxygen furnace charge without so greatly depressing the charge temperature that danger of "freezing" the charge before the oxygen blow or being unable to "teem" the vessel after the blow is encountered.

Not only is the danger of initial freezing a limiting factor but there is also presently a limitation on the size of scrap metal pieces that can be introduced at or near room temperature. For example, it is not feasible, in the absence of the teachings of this invention, to use mill scrap consisting of severed ingot tops which may weigh several thousand pounds each. Due to their size and heat capacity, these require so much time to melt in the furnace that the time for teeming arrives before fusion of the ingot top is complete.

It has now been found possible by the improved process of the present invention to raise the proportion and size of scrap metal charged to a basic oxygen furnace to amounts as high as 60% by weight of the metallic portion of charge and without increasing substantially operation costs.

I have found that the scrap metal may be preheated without impairing its ability to act as a quenching agent for a basic oxygen process, and enabling the use of up to more than twice as much scrap iron with the attendant economies effected thereby. I may also utilize large chunks of mill scrap, e.g. ingot tops, without danger or difficulty. This procedure is still further enhanced by utilizing the exhaust gases from the blowing operation in the basic oxygen furnace from which to extract the heat for preheating the scrap iron charge.

The improved process of this invention will be better understood by having reference to the annexed drawings wherein:

FIG. 1 is a diagrammatic illustration of an apparatus in which the process of my invention may be carried out, and illustrating a manner by which gases are recovered from the mouth of a basic oxygen process furnace, and utilized in a traveling endless grate apparatus on which a charge of scrap metal is preheated prior to discharge into a basic oxygen furnace. Simultaneously the exhaust gases from the basic oxygen process are tempered or diluted with relatively cold gases, e.g. air, water vapor, etc., so that equipment utilized in conducting and for removing characteristic red iron oxide fume therefrom is not destroyed from the excessive temperatures of these exhaust gases.

FIG. 3 shows a partial cross-section of a pallet entering the discharge chute region.

FIG. 4 illustrates a means by which the preheated charge from a continuous moving grate apparatus, such as a conventional Dwight-Lloyd machine, may be directly transferred to a basic oxygen furnace, or indirectly to charging boxes for subsequent discharge into a basic oxygen furnace.

Briefly stated then, the present invention is in a basic oxygen process for producing steel, and provides in such process for the inclusion of the steps of preheating scrap iron, and introducing such preheated scrap iron as a coolant for a molten charge which is to undergo ignition of fuel components or impurities in the charge in the presence of oxygen, such as carbon, manganese, silicon and phosphorus.

Figure 1:
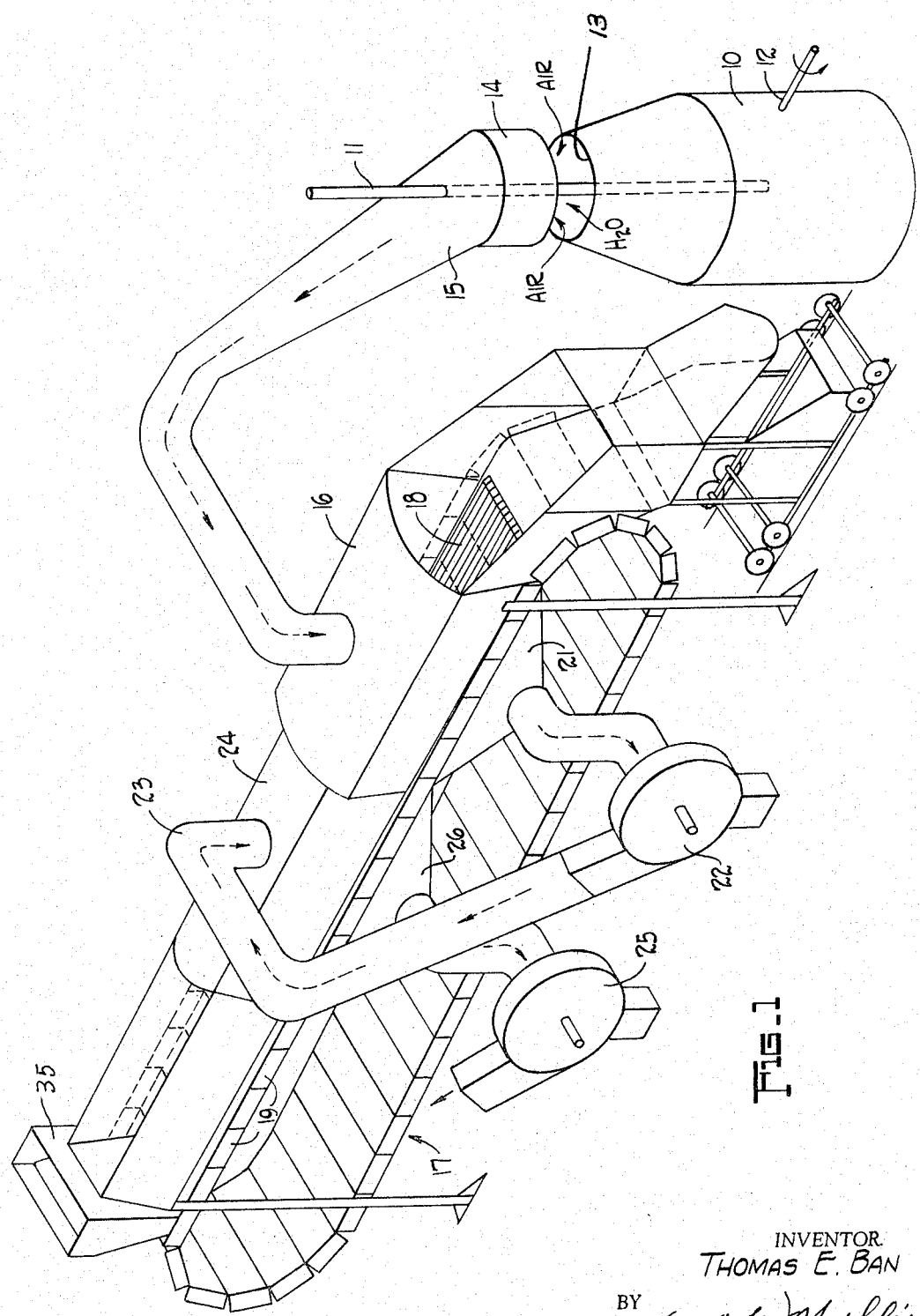

Referring now more particularly to the illustrations in the annexed drawings, FIG. 1 shows in diagrammatic form an apparatus in which it is possible to carry out the improved process of the present invention. Accordingly, there is provided a basic oxygen furnace 10 having an oxygen lance 11 for introduction of free oxygen into the furnace from a suitable source, such as commercial oxygen cylinders, not shown. Furnace 10 is mounted on suitable trunnions so as to be rotatable about axis 12 whereby the mouth 13 of the furnace 10 may be conveniently positioned for the reception of preheated scrap iron to be charged thereto, and also to be rotated for discharging the molten contents following the oxygen treatment during which impurities are removed or to use mill terminology, "fuel" is oxidized.

During the introduction of oxygen through a jet at the distal extremity of the lance 11, the temperature of the charge tends to rise rapidly due to the highly exothermic nature of the reactions of the several impurities with the oxygen. The volume of hot gases exiting from the mouth of the reaction vessel increases very substantially to a maximum during which time the carbon present in the pig iron is being converted to oxide of carbon for example, carbon monoxide. In the presence of substantially pure oxygen, this is an extremely rapid and violent reaction, and gases exiting from the mouth 13 of the furnace 10 have a temperature of approximately 3,000° F.

Collector hood 14 in surmounting relationship with respect to the mouth 13 of the furnace 10 is spaced therefrom and because of a venturi construction in combination with conduit 15, the extremely hot gases exiting from the mouth 13 at high velocity and entering collector hood 14 and passing through the constriction create a region of low pressure in the vicinity of the hood whereby ambient air is admixed with the carbon monoxide-rich gas. Under these conditions further burning of the carbon monoxide to carbon dioxide occurs resulting in an elevation of the temperature of the gases to approximately 4,500° F. At this temperature, it is extremely difficult to handle these gases, and it becomes convenient under the circumstances to introduce water or steam into the gas stream along with excess air at one or more points along the gas conduit 15. This effects a cooling of the gases to a temperature below 2600° F., preferably to a temperature in the range of about 1,800° F. to about 2,500° F.

At these reduced temperatures, the gases may be conducted to hoods 16 which form a part of a conventional Dwight-Lloyd moving grate sintering machine generally indicated at 17. Moving grate 18 is provided with a series of individually suspended pallets 19 which are moved in accordance with a predetermined program under hoods 16. Gases from conduit 15 are drawn downwardly through the scrap metal burden 20 on the pallets 19 effecting a transfer of heat from the hot gases to the burden, and a further reduction in the temperature of the gases. The gases are drawn downwardly through the burden into wind box 21 by means of fan 22, and conveniently pumped through return conduit 23 to hood 24 where the gases again pass downwardly through another portion of burden 20 and effect a preheating thereof, gas flow being maintained by means of fan 25 coacting with wind box 26 beneath the traveling grate 18.

The gases are at this point quite cool, i.e. about 300° F. to 600° F., and contain, from the standpoint of air pollution, a normally disturbing proportion of very fine red iron oxide fume. In the cooled state, exhaust gases may now be easily handled by dust collectors and precipitators of the conventional type currently employed in recovering this iron oxide from such gases and preventing air pollution.

Figure 2:
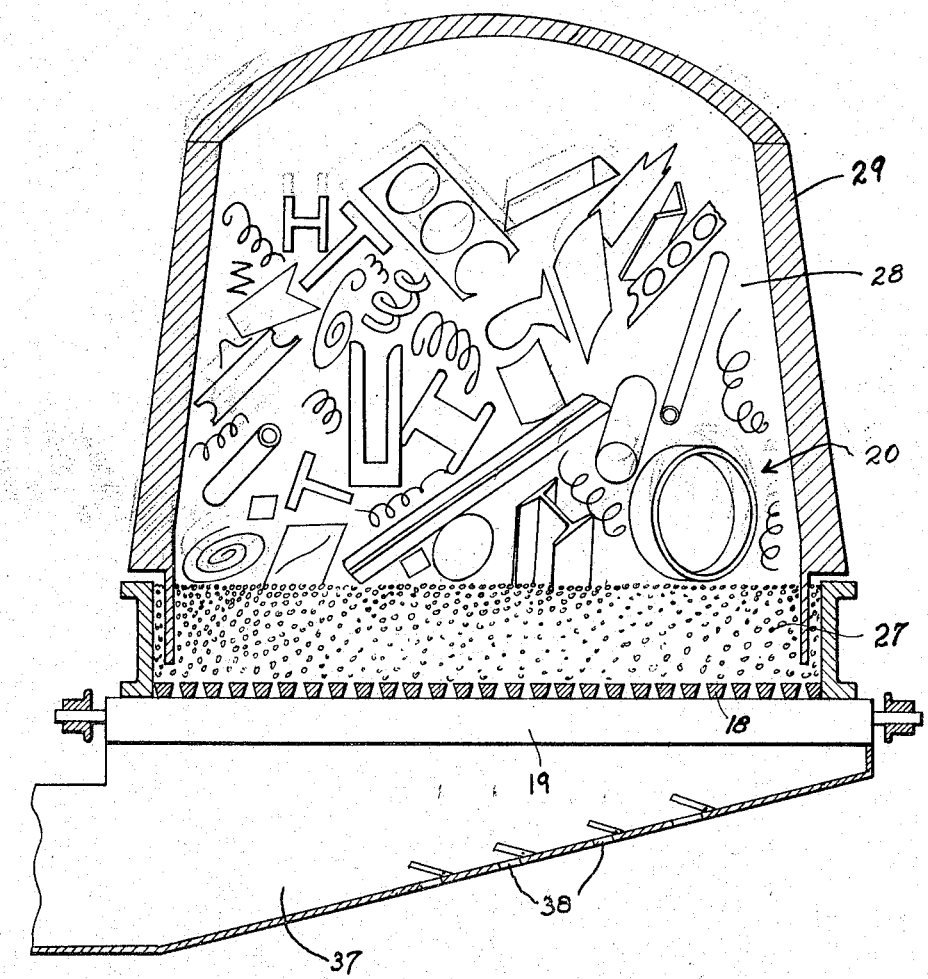
FIG. 2 shows a partial cross-section of a load and a pallet for perheating a scrap metal charge superimposed upon a layer of flux material, such as lime.
Figure 5:
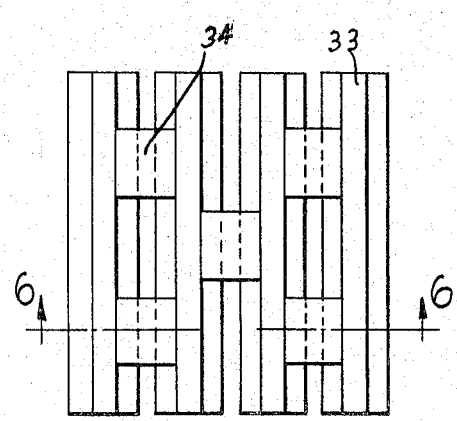
FIGS. 5 and 6 show fragmentary elevation and cross-section, respectively, of a grizzly for stripping the burden at the discharge end.

The burden 20, which is better shown in the cross-section shown in FIG. 2, desirably includes a grate or hearth layer 27 of granular material, preferably a fluxing material such as lime or limestone. In superimposed relationship to the fluxing layer 27, there is a layer 28 of scrap metal approximately 6 to 8 times as thick as the grate layer 27. Such scrap metal may be graded or not, and may consist of a vast range of sizes of chunks or bundles of metal from scrap wire, engine parts, beam sections, etc. all the way to top portions of ingots, such as those large portions severed from cast ingots and which include the dimple resulting from cooling and shrinkage of an ingot casting. Heretofore, it has not been possible to utilize large solid chunks of scrap metal for the reason that, in a normal 30 minute blowing cycle encountered in the basic oxygen process, it is not possible to heat such large scrap metal sections as ingot tops and cuttings to the point where they become molten for discharge from the basic oxygen furnace. Unmelted portions remain in the furnace and upset the careful heat balances which are necessary when using scrap as a coolant. With the preheating step of the present invention, however, such large metal sections may now be utilized with great ease and economy.

In FIG. 2, there is shown a cross-section of a pallet 19 and hood 16 having a grate 18 therein with grate layer 27 formed from a fluxing material such as lime or limestone and, in superimposed relationship therewith, a much thicker layer of scrap iron. The sidewalls of the hood are preferably sloped so as to converge at their upper extremities slightly thereby to prevent jamming of scrap material within the pallet 19 during the heating process, and to facilitate dislodgement of the heated burden 20 by the grizzly 30 (FIG. 4) for discharge either directly or indirectly into the basic oxygen furnace 10.

In the preferred embodiment, the burden 20 of the Dwight-Lloyd machine 17 is characterized by a grate layer of some granular material, preferably a flux material, such as, limestone, lime, ferruginous lime pellets, iron ore pellets, or the like which may, without deleterious effect, be added to the furnace charge. The presence of this layer is desirable not only from the standpoint that the material may aid in the purification of the metal or may be necessary to the steel making process, but it also permits easy removal of the preheated scrap material from the Dwight-Lloyd machine 17.

While the grate bars forming the grate 18 of the pallets 19 are reasonably closely spaced together, direct loading of scrap metal thereon is desirably avoided. This is particularly so in the case of loose miscellaneous unprepared scrap which in the absence of such a protective layer 27 might cause jamming at discharge, and undue wear and damage to the grate 18. By providing a grate layer 27 which is also useful in the steel making process, it becomes quite a simple matter to strip the burden 20 from the traveling grate 18 for discharge into hot scrap buckets or directly into furnace 10.

Figure 6:
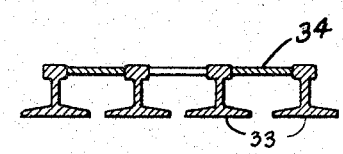

As more clearly shown in FIG. 6, grizzly 30 is composed of a plurality of elongated curved rails secured together by web portions 34 as by welding and forming a slide way over which the burden of the Dwight-Lloyd machine 17 may be conveniently discharged. The grate layer 27 also serves to minimize jamming of hot scrap metal in the spacing between the rails 33 of the grizzly 30.

In the basic oxygen steel making process as currently practiced, a typical batch formulation as charged to the furnace is as follows calculated on the basis of one ton of hot molten pig iron:

| | | |
|---|---|---|
| Hot molten pig iron, lbs | 2,000 | At 2,600° F. |
| Scrap iron. lbs | 930 | At Room Temperature. |
| Oxygen, lbs | 173 | Do. |
| Lime, lbs | 178 | Do. |
| Scale, lbs | 36 | Do. |
| Spar, lbs | 12 | Do. |
| Fe alloy, lbs | 16 | Do. |
| Refractory, lbs | 20 | Do. |
| Total lbs | 3,365 | |

The hot iron contributes 1.085 million B.t.u. to the charge. The molten pig iron may have as a typical analysis the following composition:

|  | Percent |
|---|---|
| Carbon | 4.3 |
| Manganese | 0.5 |
| Phosphorus | 0.112 |
| Silicon | 1.3 |
| Iron | Balance |

The purification of the molten pig iron by the basic oxygen process results in several highly exothermic reactions which contribute still further units of heat. Assuming a typical final hot steel analysis as follows:

| | Percent |
|---|---|
| Carbon | 0.1 |
| Manganese | 0.05 |
| Phosphorus | 0.012 | the following reactions and heat yields are obtained:

| | Lbs. | B.t.u.×10⁶ |
|---|---|---|
| Carbon to CO | 75.6 | 0.32 |
| Carbon to CO₂ | 8.4 | 0.12 |
| Manganese to MnO | 9.0 | 0.03 |
| Phosphorus to 4CaO·P₂O₅ | 2.0 | 0.03 |
| Silicon to 2CaO·SiO₂ | 26.0 | 0.42 |
| Iron to 15% FeO | 34.5 | 0.16 |
| Iron to 5% Fe₂O₃ | 10.5 | 0.04 |
| | | 1.020 |

The output of the furnace so operated is as follows:

| | Lbs. | Temp., °F. | B.t.u.×10⁶ |
|---|---|---|---|
| Steel | 2,816 | 2,900 | 1.610 |
| Slag-Fume | 342 | 2,900 | .315 |
| CO | 176 | 3,000 | 0.148 |
| CO₂ | 31 | 3,000 | 0.027 |
| | | | 2.105 |

Accordingly, the heat input is the sum of the sensible heat of the molten pig and the heat of reaction, i.e., $1.085+1.020=2.105$ million B.t.u. which balances the output heat of 2.105 million B.t.u.

The exit gases comprising CO and CO₂ may be further oxidized to yield latent heat in addition to the sensible heat, the latent heat available in burning 176 lbs. of CO to CO₂ being $0.764\times 10^6$ B.t.u. The total available heat in the exit gases is, therefore, about $.939\times 10^6$ B.t.u. This heat is normally wasted. Assuming heat losses in the duct work to be 10%, the net available heat for preheating is approximately 845,000 B.t.u.

This heat is both latent and sensible and contained in gases that may reach a temperature in excess of about 3000° F. When the carbon monoxide is burned to carbon dioxide, the total heat in that weight of gas which contains only CO₂ and nitrogen, i.e., without excess temperature regulating diluent air, calculates to be 308 pounds of carbon dioxide and 330 pounds of nitrogen. The reaction of carbon monoxide with air proceeds in accordance with the following equation:

$$CO + \tfrac{1}{2}O_2 + 1.88N_2 = CO_2 + 1.88N_2$$

On the basis of 176 lbs. of CO and 31 lbs. of CO₂ in the existing furnace gas, as above calculated, the analysis of 308 pounds of CO₂ and 330 lbs. N₂ follows, or a total of 638 lbs. of gas containing 845,000 B.t.u. of heat after burning with air. Thus the theoretical temperature of this gas is approximated by:

$$\frac{845,000}{.31 \times 638} = T = 4260° F.$$

To be useful in the process of this invention, the temperature must be lowered to a convenient level, e.g., 2400° F., by dilution with a relatively cooler gas, conveniently ambient air and/or water vapor.

Assuming a final temperature of about 2400° F. and neglecting the initial temperature of the air or considering it to be zero, then the total number of pounds of gas at a delta-T of 2400° F. is given by:

$$\frac{845,000}{.28 \times 2400} = Q \text{ lbs. of gas} = 1260 \text{ lbs.}$$

In other words, it was necessary to dilute the original 638 lbs. of gas with 622 lbs. of air to reduce its temperature to about 2400° F.

The original gas composition of 308 lbs. of CO₂ and 330 lbs. of N₂ has now been altered to:

| | Lbs. |
|---|---|
| Carbon dioxide | 308 |
| Nitrogen | 800 |
| Oxygen | 152 |
| | 1260 |

Converting this to cubic feet, the gas volume is 14,500 cu. ft. at standard conditions or approximately 485 s.c.f.m. during a 30 minute oxygen blow.

Utilizing a two hood, double pass system such as shown in FIG. 1, the gases exit at about 500° F. This accounts for:

$$1260 \times 500° F. \times 0.24 = 151,200 \text{ B.t.u.}$$

During the after-blow time of about 25 minutes, another 1050 lbs. of air are drawn through the louvers in the wind boxes which are open, permitting cooling of the pallet 19 and grates 18. Such air exits at about 450° F. and accounts for:

$$1050 \times 450° F. \times 0.24 = 113,700 \text{ B.t.u.}$$

During the heating cycle, the calculated amount of lime, about 173 lbs. is heated to 1500° F. taking up $$173 \times 1500 \times .341 = 88,500 \text{ B.t.u.}$$

Utilizing 1800 lbs. of scrap iron, or 47.4% of the metallic charge, such scrap being raised to 1500° F., the heat requirement is $$1800 \times 1500° F. \times .166 = 448,000 \text{ B.t.u.}$$

The loss through the Dwight-Lloyd machine is then about 44,000 B.t.u.

The above illustration cites a system for preheating scrap to 1500° F. However, practical preheated scrap temperatures up to about 2200° F. can be acquired thus enabling use of still higher quantities of scrap iron coolant, e.g., up to 60% by weight of the metallic content of the charge.

Basically, and in accordance with the above illustration, the amount of solid preheate dscrap iron utilized in any given tonnage situation is such that the heat required to melt the scrap and raise it to a preselected teeming temperature, e.g., 2900° F., is in excess of its sensible heat by an amount sufficient to absorb the surplus or non-radiated heat of the exothermic steel making reaction; and at the same time in order to gain the benefits of higher scrap utilization, the sensible heat of the preheated scrap is in excess of the sensible heat of unpreheated scrap at the temperature of its environs, i.e., ambient temperature. By utilizing an amount of scrap so determined, the thermal diluent effect of scrap addition to a basic oxygen process is preserved, and at the same time the economic advantages of higher proportions of scrap in a given charge are secured.

It has been found that the maximum proportions of scrap are determined to some extent by the size of the furnace being used and its radiation characteristics. For example, a 30 ton furnace (i.e. 30 tons of finished steel) can presently utilize no more than about 15% by weight of unpreheated scrap. By the present improved process, more than 30% by weight of preheated scrap may be used. With a 200 ton furnace, up to about 30% by weight of unpreheated scrap can currently be used. By the pressure improved process, amounts of preheated scrap in excess of 60% by weight may be safely used. An increase in the number of small capacity furnaces can be expected as continuous casting becomes more highly developed. The present improved process is readily adaptable to large or small installations enabling throughout the range of furnace sizes utilization of up to twice as much scrap as a thermal diluent.

Practical proportions of preheated scrap iron are in the range of from 25% to 60% by weight of the metallic components of the charge with a preheat temperature of above about 500° F. and especially from about 1800° F. to about 2200° F. The higher the preheat temperature the greater the quantity of thermal diluent (scrap alone, scrap plus fluxing material, iron ore pellets, etc.) that can be tolerated.

External sources of heat preheating the scrap may be used to replace part or all of the preferred exhaust gas heat source, if desired. Thus oil or gas burning torches located in hood 16 may be used, for example during the teeming portion of the cycle in which case louvers 38 are closed.

In a normal installation of the basic oxygen furnace process, each station includes a pair of furnaces in side-by-side relation. It is usual that while one of the furnaces is in operative condition, the other furnace is undergoing relining. The life cycle of a basic oxygen furnace is about one week, a refractory lining having a life of about 200 charges.

A typical cycle for operation of a basic oxygen furnace process involves first the step of loading the furnace with molten pig iron from a blast furnace. Assuming a 220 ton heat there may be supplied as coolant, a total of 109 tons of preheated scrap and 11 tons of lime. On a standard Dwight-Lloyd moving grate sintering machine there may be provided a burden of about 1 foot depth of lime or 1½ feet of limestone, and approximately 6 to 6½ feet of scrap metal. In place of lime there may be used ferruginous lime pellets as a hearth layer. The hearth layer serves not only as a grate protection bedding, but also a cushion for absorbing the impact of scrap metal as it is charged to the grates. This bedding also serves as a diffusion medium for enabling more uniform draft flow within the heating zone, and to minimize the amount of heat which is ultimately transferred to the grate bars themselves.

The hearth layer 27 may be applied in a uniform layer from a charge hopper 35 as the grate moves forward during the furnace charging phase of the cycle, and the scrap may be placed upon a stationary bed of the flux layer on the grate during the times when the burden is being heated and the grate is not moving.

As indicated previously, the heat exchanging operation follows the batch process of steel refining, and as such, the traveling grate 18 operates intermittently in meeting the charging requirements. Also the heat exchanging operations are accomplished largely during the blow cycle which causes the evolution of abundant quantities of high temperature gases.

For example, starting with an empty furnace 10, there is first charged to the furnace approximately 121 tons of molten pig iron. There is then charged to the furnace a quantity of a cooling material, i.e., preheated scrap iron in the amount of approximately 109 tons together with 11 tons of lime to provide a total of about 241 tons of charged material for heating. During the next 28 to 30 minutes, pure oxygen is introduced into the vessel, the discharge nozzle of the oxygen lance 11 being several inches above the top of the molten slag layer. This cycle is continued until the "rooster tail" flame subsides, and it is evident that no further oxidation reaction is occuring. During the blowing operation, the gases exiting from the mouth 13 of the furnace 10 are being passed through the next scrap-limestone charge as previously described. After the blowing with oxygen has been completed, the molten contents of the furnace are tapped during what is called the "teeming" portion of the cycle. The total cycle requires about 50 minutes.

There is also shown in FIG. 2 a cross-section of the traveling grate 18 containing a louvered wind box 37. During the tapping cycle or teeming cycle of the heat, it is possible to open the louvers 38 to admit air so as to cool the pallet grates 18 by convection. Draft guided by the louvered openings in the wind boxes 37 can be impinged on the metal grate members to effect cooling. During the heat exchanging operation, the louvers 38 are closed by any suitable means so that the full draft can be induced in the scrap-flux burden 20.

It is quite clear that the preceding process may be modified in a number of ways. For example, the hearth layer of flux may be omitted and light scrap material substituted therefor. In the preferred embodiment, the heat exchanging operation is performed in two stages as illustrated in FIG. 1 showing the heat and preheating stages. If lower efficiency is desired in the heat exchanging process with a reduction in the requisite grate areas, the preheating stage may be omitted and a single heating stage substituted therefor by directing the exit gases directly into a single compartment and venting the heat depleted gases to exhaust.

The amount of preheated scrap metal and flux will be determined ultimately by the temperature by the pig iron introduced into the furnace, the content of oxidizable impurities, the size of the furnace and the cooling effect of the walls upon the mass, as well as the final desired temperatures of the melt and of the preheated scrap iron. As indicated above, it is desirable that the scrap iron shall be elevated to a temperature which will still allow sufficient margin for regulation of the temperature of the refined molten metal mass to a point which will permit ready pouring or "teeming" of the melt from the furnace. In present day practice, the final melt desirably has a temperature in excess of about 2,900° F., the temperature at which it is desirable to pour the purified charge from the furnace.

While in the previous discussion reference has been had to the use of scrap iron and lime as desirable burden ingredients for preheating prior to introduction into the basic oxygen furnace, there may be used in place of the scrap iron high grade iron ore in the form of pellets or lump structures. At times this is a preferred coolant for regulation of the basic oxygen furnace charge because of the stabilized and uniform price. Any requisite amounts of iron ore used for steel making operations may be preheated on the traveling grate apparatus of the present invention with due account for the new metallurgical balance and with regard to the metallic and flux additions. It is proposed that the iron ore may be treated by this same traveling grate arrangement and in this manner applied as a blend, with or without scrap and flux, as the hearth layer or as the sole burden.

There has thus been provided an improved process for producing steel utilizing the basic oxygen technique whereby improvement has been effected through elevation of the amount of relatively cheap scrap material which may be used as a coolant in the basic oxygen process. By this improved process it is now possible to more than double the quantities of scrap metal currently being used. Still further economies may be effected by reason of utilizing the exhaust gases from the basic oxygen furnace as the heat carrying medium from which heat is exchanged in a Dwight-Lloyd traveling grate machine as the heat exchanger. Through use of this type of heat exchange system, smaller sizes of exhaust gas treating equipment can be used.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A basic oxygen process for making steel which comprises in combination:
(a) charging a predetermined quantity of molten pig iron to a basic oxygen furnace;
(b) charging a hearth layer of slag forming material to a traveling grate machine;
(c) superimposing upon said hearth layer, a layer of scrap iron to form a composite burden on said traveling grate machine;

(d) preheating said burden on said traveling grate machine to a temperature of from about 1000° F. to about 2200° F. by passing exhaust gases from a basic oxygen furnace through said burden;
(e) separating said preheated scrap iron from said hearth layer;
(f) charging said scrap iron at said preheated temperature to the basic oxygen furnace for admixture with said molten pig iron in an amount such that the heat required to melt the scrap iron and raise it to a predetermined teeming temperature is in excess of the sensible heat of said scrap iron by an amount sufficient to absorb the exothermic heat of the steel making reaction;
(g) charging a predetermined quantity of slag forming material from said hearth layer to the basic oxygen furnace;
(h) blowing the charge including said molten pig iron, said preheated scrap iron, and said slag forming material with a free oxygen containing gas;
(i) admixing the gases exiting from said basic oxygen furnace with an oxygen containing gas to oxidize oxidizable components thereof and to reduce the temperature of said exhaust gases; and
(j) directing said oxidized and cooled exhaust gases into heat exchange relation with a scrap iron-slag forming material composite burden to effect preheating thereof.

2. A basic oxygen process for making steel which comprises in combination:
(a) charging a predetermined quantity of molten pig iron to a basic oxygen furnace;
(b) charging a hearth layer of slag forming material to a traveling grate machine;
(c) superimposing upon said hearth layer, a layer of scrap iron to form a composite burden on said traveling grate machine;
(d) preheating said burden on said traveling grate machine to a temperature of from about 1000° F. to about 2200° F. by passing exhaust gases from a basic oxygen furnace through said burden;
(e) separating said preheated scrap iron from said hearth layer;
(f) charging said scrap iron at said preheated temperature to the basic oxygen furnace for admixture with said molten pig iron in an amount such that the heat required to melt the scrap and raise it to a predetermined teeming temperature is in excess of the sensible heat of said scrap iron by an amount sufficient to absorb the exothermic heat of the steel making reaction;
(g) charging a predetermined quantity of slag forming material from said hearth layer to the basic oxygen furnace;
(h) blowing the charge of said pig iron, said scrap iron, and said slag forming material with a free oxygen containing gas; and
(i) directing exhaust gases from the blowing step into heat exchange relation with a scrap iron burden to effect preheating thereof.

3. A basic oxygen process for making steel which comprises in combination:
(a) charging a predetermined quantity of molten pig iron to a basic oxygen furnace;
(b) charging a hearth layer of slag forming material to a traveling grate machine;
(c) superimposing upon said hearth layer, a layer of scrap iron to form a composite burden on said traveling grate machine;
(d) preheating said burden on said traveling grate machine to a temperature of from about 1000° F. to about 2200° F. by passing exhaust gases from a basic oxygen furnace through said burden;
(e) separating said preheated scrap iron from said hearth layer;
(f) charging said scrap iron at said preheated temperature to the basic oxygen furnace for admixture with said molten pig iron in an amount such that the heat required to melt the scrap iron and raise it to a predetermined teeming temperature is in excess of the sensible heat of said scrap iron and by an amount sufficient to absorb the exothermic heat of the steel making reaction;
(g) charging a predetermined quantity of slug forming material from said hearth layer to the basic oxygen furnace; and
(h) blowing the charge including said molten pig iron, said preheated scrap iron, and said slag forming material with a free oxygen containing gas.

References Cited by the Examiner

UNITED STATES PATENTS

| | | | |
|---|---|---|---|
| 2,291,222 | 7/1942 | Gibson | 75—60 |
| 2,818,247 | 12/1957 | Francis | 75—60 |
| 3,022,990 | 2/1962 | McFeaters et al. | 266—36 |

FOREIGN PATENTS

| | | |
|---|---|---|
| 1,138,829 | 2/1957 | France. |
| 872,088 | 7/1961 | Great Britain. |

BENJAMIN HENKIN, *Primary Examiner.*